Aug. 27, 1940.    O. KREMMLING    2,212,743
BISCUIT MOLDING MACHINE
Filed Jan. 3, 1939
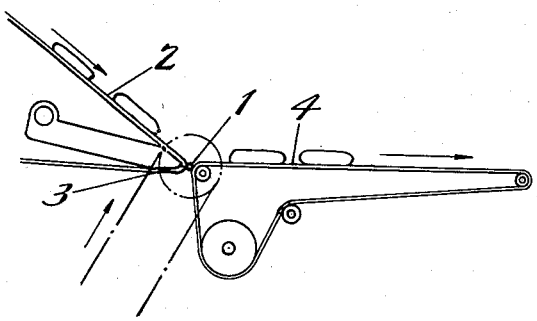
INVENTOR.
OTTO KREMMLING
BY George B. Willcox
ATTORNEY Patented Aug. 27, 1940

2,212,743

UNITED STATES PATENT OFFICE 2,212,743

BISCUIT MOLDING MACHINE

Otto Kremmling, Hamersleben, Germany

Application January 3, 1939, Serial No. 248,916
In Germany July 28, 1934

3 Claims. (Cl. 198—25)

This invention relates to a device for loosening soft, sticky dough pieces from a conveyor band for discharge onto a second conveying surface, and is particularly adapted to use with the take-off band of drum-type biscuit molding machines, as shown in my United States Patent No. 2,167,388, issued July 25, 1939, of which this present application is a continuation in part. In machines of this type the dough pieces in the mold pockets are pressed forcibly against the conveyor band in order that they may adhere firmly thereto for clean removal from the molds. With soft, tender, and sticky doughs it is especially difficult to loosen and lift the dough pieces from such a conveyor band without jamming, crushing, or distorting the forward edges of the dough pieces. Many devices have been tried in an attempt to free the biscuits without damage, such as for example, a strip of wire, or blade in contact with the conveyor band adjacent its point of turning over a nosing where the biscuits were to be discharged. Also, an imperfectly loosened biscuit would often travel with the band around the nosing, smearing both the discharge band and the surface upon which the dough was to be discharged, and destroying the biscuits.

The object of the present invention is to provide a novel means for positively and cleanly lifting dough pieces of the class described from a conveyor to which they adhere, with a minimum of distortion or other damage, and depositing them lightly on a second conveying surface, such as the band conveyor of a continuous oven or an intermediate transfer band.

The apparatus by which I have accomplished this purpose is shown in the accompanying drawing, in which 2 designates a conveyor band, such as the take-off web of the biscuit molding machine shown in my copending application referred to. The take-off band 2 passes around a knife edge or nosing 3 of slight radius, at which point the biscuits are to be discharged onto a closely adjacent conveyor 4 traveling in the same direction. The drawing shows conveyor 4 diagrammatically as an intermediate transfer band of known kind, which may discharge the biscuits onto baking pans or a baking conveyor.

The novel device for freeing the biscuits from the surface of conveyor band 2 consists of a thin cylindrical revolving rod or shaft in contact with band 2 across its width where it passes around the knife edge 3. It is driven as indicated, from any suitable revolving machine shaft in the same direction as the conveyors 2 and 4, that is, clockwise in the drawing, preferably at a rate such that its surface speed matches the rate of travel of the conveyors. As it encounters the leading edge of a biscuit on the conveyor 2, by reason of its small diameter, it frees the leading edge of the biscuit from the surface and simultaneously carries the free edge over the gap between the conveyors 2 and 4. By its transporting action it prevents or minimizes the blocking effect and rearward pressure upon the soft sticky dough which is produced by a stationary wire or rod of the same diameter. It thus avoids crushing or distorting the biscuits at such edge. Instead the biscuits are quickly and positively lifted from the surface of band 2 and are gently carried over shaft 1 and laid upon the surface of conveyor 4.

Having thus described my invention, what I claim and desire to secure by Letters Patent is:

1. In apparatus for handling biscuits of soft sticky dough comprising a pair of dough-piece forwarding conveyors arranged in tandem, one discharging over a knife edge or nosing onto the other, in combination, a thin rotatable rod extending transversely of said first conveyor at the point of discharge of biscuits therefrom and positioned in contact with the face of the conveyor where it passes over said nosing, and means for revolving said rod in the direction of travel of the conveyors whereby it loosens said biscuits from the first conveyor and discharges them onto the second conveyor.

2. In apparatus for handling biscuits of soft sticky dough or like material comprising a dough-piece conveyor discharging over a knife edge or nosing, in combination, a slender rotatable rod extending transversely of said conveyor at the point of discharge therefrom and positioned in contact with the face of the conveyor where it passes over said nosing, and means for revolving said rod in the direction of travel of said conveyor whereby it loosens and discharges the biscuits therefrom.

3. In apparatus for handling biscuits of soft sticky dough or like material comprising a dough-piece conveyor discharging over a knife edge or nosing, in combination, a slender rotatable rod extending transversely of said conveyor and positioned in contact with the face of the conveyor, and means for revolving said rod in the direction of travel of said conveyor whereby it loosens the biscuits therefrom.

OTTO KREMMLING.